O. VAN TASSELL.
Bolt Feeder.

No. 95,289.

Patented Sept. 28, 1869.

United States Patent Office.

OSCAR VAN TASSELL, OF NAPERVILLE, ILLINOIS.

Letters Patent No. 95,289, dated September 28, 1869.

IMPROVEMENT IN BOLT-FEEDERS.

The Schedule referred to in these Letters Patent and making part of the same.

*To all whom it may concern:*

Be it known that I, OSCAR VAN TASSELL, of Naperville, in the county of Du Page, and State of Illinois, have invented a new and useful Improvement in Bolt-Feeder; and I do hereby declare that the following is a full, clear, and exact description thereof, which will enable others skilled in the art to make and use the same, reference being had to the accompanying drawings, forming part of this specification.

Figure 1:
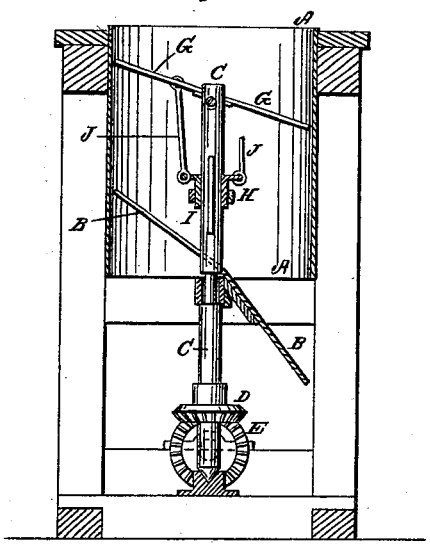
Figure 1 is a vertical longitudinal section of my improved bolt-feeder, taken through the line x x, fig. 2.
Figure 2:
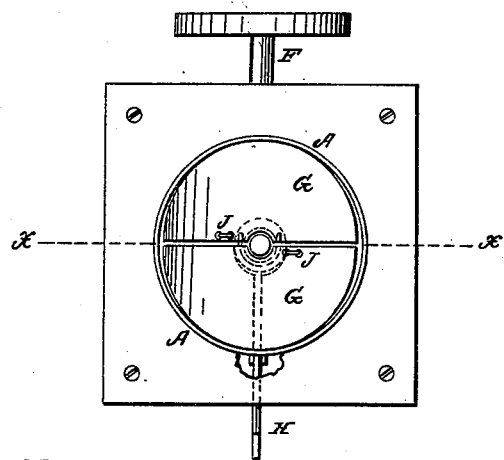
Figure 2 is a top view of the same.

My invention has for its object to furnish an improved device, by means of which the flour or meal is fed faster or slower to the bolt, as may be desired, and which shall, at the same time, be simple in construction and easily operated; and It consists in the construction and combination of the various parts, as hereinafter more fully described.

A represents the cylinder or spout, through which the flour or meal is conducted to the bolt.

In the lower end of the cylinder A is placed an apron or chute, B, by means of which the flour is guided into the bolt.

C is a vertical shaft, passing up through the centre of the cylinder A, and revolving in and being supported by bearings, attached to the frame-work that supports the said cylinder A.

To the lower end of the shaft C is attached a bevel-gear wheel, D, into the teeth of which mesh the teeth of the bevel-gear wheel E, attached to the shaft F, which is connected with and driven from the driving-mechanism of the mill, by a pulley and band, or by other well-known and convenient means.

Through the upper end of the shaft C, passes a cross-bar, to which are pivoted, and upon which rest two semicircular disks G, which form the auger or screw, by which the flour is fed to the bolt.

H is a lever, which passes in through a hole in the side of the cylinder A, and is pivoted to the said cylinder.

The inner end of the lever H is forked, and rides upon a groove in the collar I, which slides up and down for a short distance upon the shaft C, and is connected with said shaft in such a way as to be carried around with it in its revolution.

J are two rods, the lower ends of which are pivoted to the sliding collar I, and the upper ends of which are connected with the wings or semicircular disks G, upon opposite sides of the rod, to which said disks are pivoted, so that when the collar I is raised, the opposite ends of said disks or wings will be raised, to feed the flour forward to the bolt.

By this construction, by raising the collar I more or less, the pitch of the wings G will be adjusted, to feed the flour forward faster or slower, as may be desired.

If desired, the wings G may be rigidly attached to the shaft C, and the feed be regulated by adjusting the speed at which the shaft C is driven.

Having thus described my invention,

I claim as new, and desire to secure by Letters Patent—

1. The wings or semicircular disks G and shaft C, in combination with the cylinder or spout, through which the flour or meal is conducted to the bolt, when said parts are constructed and operated substantially as herein shown and described, and for the purpose set forth.

2. The combination of the lever H, sliding collar I, connecting-rods J, pivoted wings or semicircular disks G, and shaft C, with each other, and with the cylinder or spout, through which the flour or meal is conducted to the bolt, substantially as herein shown and described, and for the purpose set forth.

OSCAR VAN TASSELL.

Witnesses:
WM. NAPER,
DANL. N. GROSS.